United States Patent
Tanaka et al.

(10) Patent No.: US 6,623,812 B1
(45) Date of Patent: Sep. 23, 2003

(54) REFLECTOR, METHOD FOR FABRICATION THEREOF AND REFLECTIVE LIQUID CRYSTAL DISPLAY DEVICE INCORPORATING THE REFLECTOR

(75) Inventors: Hideto Tanaka, Kyoto (JP); Hiromasa Minamino, Neyagawa (JP); Hirokazu Kaji, Suita (JP); Masashi Ohata, Neyagawa (JP); Mamoru Seio, Takatsuki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/510,950

(22) Filed: Feb. 22, 2000

(30) Foreign Application Priority Data

Feb. 23, 1999 (JP) .......................... 11/044651

(51) Int. Cl.[7] .......................... G02F 1/1335
(52) U.S. Cl. ............. 428/1.54; 428/1.1; 428/1.33; 428/1.55; 428/349; 428/112; 428/113; 428/359; 428/599; 428/362; 428/307
(58) Field of Search .............. 428/1.1, 1.3, 1.33, 428/1.5, 1.54, 1.55; 359/599; 362/31, 223, 268, 307, 311; 349/112, 113

(56) References Cited

U.S. PATENT DOCUMENTS

| | | | | |
|---|---|---|---|---|
| 5,128,787 A | * | 7/1992 | Blonder | 359/70 |
| 5,852,514 A | * | 12/1998 | Toshima et al. | 359/599 |
| 6,111,699 A | * | 8/2000 | Iwata et al. | 359/599 |
| 6,166,793 A | * | 12/2000 | Hayashi et al. | 349/113 |
| 6,268,108 B1 | * | 7/2001 | Iguchi et al. | 430/271.1 |

FOREIGN PATENT DOCUMENTS

| | | |
|---|---|---|
| JP | 61-102687 | 5/1986 |
| JP | 04-267220 | 9/1992 |
| JP | 10-177220 | 6/1998 |
| JP | 11-006907 | 1/1999 |
| JP | 11-287992 | 10/1999 |

* cited by examiner

Primary Examiner—Harold Pyon
Assistant Examiner—Sow-Fun Hon
(74) Attorney, Agent, or Firm—Olson & Hierl, Ltd.

(57) ABSTRACT

A reflector is disclosed which enables bright image display with a wide angle of view and can be efficiently fabricated by a a simplified process. The reflector includes a resin layer having at its surface microscopic projections and depressions and formed by application of a coating composition containing a binder resin and crosslinked resin particles.

4 Claims, 1 Drawing Sheet

REFLECTOR, METHOD FOR FABRICATION THEREOF AND REFLECTIVE LIQUID CRYSTAL DISPLAY DEVICE INCORPORATING THE REFLECTOR

BACKGROUND OF THE INVENTION

1. Field of the Invention

The present invention relates to a reflector for liquid crystal devices, a method for fabrication of the reflector, and a reflective liquid crystal display device incorporating the reflector.

2. Description of Related Art

Transmission type or transmissive liquid crystal display ("LCD") devices have been conventionally used which have a flat-type light source, called a backlight, behind a liquid crystal panel. However, the backlight used in this type of LCD devices consumes a large amount of electric power. The incorporation of such an LCD device in rechargeable battery-operated, portable information terminal equipments, so-called "mobile terminals", has accordingly led to the shortened service lives thereof, which has been a problem.

As a solution to such a problem, a reflection-type or reflective LCD device has been proposed which incorporates a reflector for reflecting the incident light that has passed through a liquid crystal layer. Display images are created by reflecting ambient light at the reflector surface toward a front side of the device. Elimination of the backlight results in the marked reduction of power consumption and extension of service lives of portable information terminal equipments incorporating the reflective LCD device.

A conventional reflector for use in such reflective LCD devices utilizes a thin metal film formed by depositing a metal, such as aluminum or silver, by various techniques, including vacuum evaporation, sputtering and ion-plating.

However, the thin metal film such deposited generally has a specular surface which provides the high-intensity reflected light with the angle equal to the angle of incidence, and accordingly, its use problematically results in a narrow angle of view.

In order to obtain a wider angle of view, the intensity of light scattered in a direction perpendicular to a display screen must be increased for incident light that enters from all directions. For this purpose, a method has been proposed which provides microscopic projections and depressions over an entire surface of a reflector to assure diffuse reflection. This method improves the problem of narrow angle of view, since diffusion reflection occurs at the entire surface of the reflector due to the presence of the microscopic projections and depressions provided thereon.

The techniques used to provide such microscopic roughness on a reflector surface are broadly classified into two types. A first type of techniques treats a reflector substrate itself, as by polishing with abrasive or etching with chemicals. However, the practice of this type of techniques results in poor reproducibility of the shapes of microscopic projections and depressions, and accordingly in the difficulty to control microscopic light diffusion at the reflector surface.

A second type of techniques utilizes a photosensitive resin which, after being applied to a reflector substrate, is etched, as by a photolithographic process, to form a mat surface of microscopic roughness that is subsequently covered with a reflection layer. However, this type of techniques requires a number of steps, increasing the complexity of a reflector-forming process. Also, it has been difficult to provide an even distribution of uniformly shaped projections and depressions over a wide area such as of a display part of LCD devices. These deficiencies have led the display part to exhibit reflective characteristics largely varied from location to location.

SUMMARY OF THE INVENTION

An object of the present invention is to provide a reflector, suitable for use in liquid crystal display devices, which performs uniform light diffusion enabling a wide angle of view and which can be efficiently fabricated by a simple process, a method for fabrication thereof and a reflective liquid crystal display device incorporating the reflector.

The reflector of the present invention is particularly suitable for use in reflective liquid crystal display devices which display images by reflecting at a reflector surface the incident light that has passed through a liquid crystal layer. The reflector includes a resin layer having at its surface microscopic projections and depressions, or alternatively, a light diffusion layer, respectively formed by application of a coating composition containing a binder resin and crosslinked resin particles.

In accordance with a first aspect of the present invention, the reflector includes a resin layer having at its surface microscopic projections and depressions and formed by application of a coating composition containing a binder resin and crosslinked resin particles, and a reflection layer provided on the resin layer so as to follow the shapes of microscopic projections and depressions of the resin layer.

In the reflector according to the first aspect, the reflection layer thereof follows the surface profile of the underlying resin layer to have microscopic projections and depressions. Accordingly, diffusion reflection of incident light occurs at a surface of the reflection layer in such a fashion that the reflected light can be scattered in a direction perpendicular to a display screen.

In accordance with a second aspect of the present invention, the reflector has a reflection layer and a light diffusion layer formed on the reflection layer by application of a coating composition containing a binder resin and crosslinked resin particles.

In the reflector according to the second aspect, light incident thereupon passes through the light diffusion layer and arrives at a surface of the reflection layer where it is reflected. The reflected light, when it passes through the light diffusion layer, is scattered in a direction perpendicular to a display screen.

In the first aspect of the present invention, the incorporation of the crosslinked resin particles in the coating composition imparts the microscopic surface roughness to the resin layer. Such use of the crosslinked resin particle is based on the ground that they can be manufactured in the form of very fine particles showing a sharp particle size distribution curve. For example, the crosslinked resin particles can be manufactured having a particle size distribution which permits particles in the 10 nm–1,000 nm size range to account for at least 90%, preferably at least 95% of the particles. The use of such crosslinked resin particles assures an even distribution of uniformly-shaped microscopic projections and depressions over an entire surface of the resin layer. The crosslinked resin particles for use in the present invention preferably have an average particle size in the range of 50 nm–600 nm. The particle size distribution of the crosslinked resin particles can be determined as by a laser diffraction type particle size distribution measuring apparatus. Although having fine particle sizes, the crosslinked resin particles are dispersed in a uniform fashion throughout the resin layer, which further assures the even distribution of uniformly-shaped microscopic projections and depressions over an entire surface of the resin layer.

In the second aspect of the present invention, the inclusion of the aforementioned crosslinked resin particles in the coating composition results in the formation of the light diffusion layer having desired light diffusivity on the reflection layer. In the second aspect, such use of crosslinked resin particles serves to impart uniform and satisfactory light diffusion characteristics to the light diffusion layer. Those crosslinked resin particles have the reduced refractive index and are less affected by optical interference compared to inorganic particles, and the use thereof results in the reduced occurrence of problematic white spots and the like on displayed images.

The crosslinked resin particles used in the present invention can be prepared by various polymerization techniques, including emulsion polymerization, soap-free emulsion polymerization using no emulsifier, and dispersion polymerization using a polar organic solvent as a medium.

The particularly preferred, crosslinked resin particles can be prepared by mixing an emulsifiable resin, such as an alkyd or polyester resin, synthesized using a monomer having a zwitter ion group as one of polyol components, with an ethylenically unsaturated monomer in an aqueous medium, and subjecting the aqueous mixture to emulsion polymerization with the aid of an initiator.

The aforementioned monomer having a zwitter ion group in a molecule may be represented, for example, by $-N^+-R-COO_-$ or $-N_+-R-SO_{3-}$, and preferably contains two or more hydroxyl groups. Hydroxyl-containing aminosulfonic acid type amphoteric compounds are preferred from a synthetic point of view. A specific example is bis(hydroxyethyl)taurine.

Preferred for use as the emulsifiable and zwitter ion group-containing resin synthesized from the aforementioned monomer is a polyester resin having an acid value in the range of 30–150 mgKOH/g, preferably in the range of 40–150 mgKOH/g, and a number-average molecular weight in the range of 500–5,000, preferably in the range of 700–3,000. If the acid value and number-average molecular weight become excessively high, a handling property of the resin may be lowered. On the other hand, if the acid value and number-average molecular weight become excessively low, the emulsifiable resin may have a higher tendency to fall from a resulting coating film. The reduced solvent resistance of the film may also result.

The aforementioned ethylenically unsaturated monomer preferably contains a monomer component having two or more free-radically polymerizable ethylenically unsaturated groups in a molecule. Such a monomer component is incorporated in the amount of 0.1–90%, preferably of 10–70% based on the total weight of the ethylenically unsaturated monomer components. Because of inclusion of such a monomeric unit, the resulting crosslinked resin particles can be imparted thereto a crosslinking level sufficient to become insoluble in organic solvents.

The aforementioned crosslinked resin particles, because of their suitable crosslinking level, exhibit appropriate levels of hardness and heat resistance, and are unlikely to deform even when exposed to heat in subsequent steps, such as a forming step of the reflection layer. This permits the resin layer to successfully retain the shapes of microscopic projections and depressions.

The crosslinked resin particles for use in the present invention is not limited to those types described above, and may be of the other types if applicable to the present invention.

Examples of the monomer components containing two or more free-radically polymerizable ethylenically unsaturated groups in a molecule include polymerizable unsaturated monocarboxylic acid esters of polyhydric alcohol, polymerizable unsaturated alcohol esters of polybasic acid, and aromatic compounds having two or more substituted vinyl groups.

Besides the above-described crosslinking monomers, α,β-ethylenically unsaturated monomers can also be used which include, for example, carboxyl-containing monomers such as acrylic or methacrylic acid; hydroxyl-containing monomers such as 2-hydroxyehtyl acrylate; nitogen-containing alkyl acrylates or methacrylates such as dimethyl aminoethyl acrylate; polymerizable amides such as acrylamide; polymerizable nitrites such as acrylonitrile; alkyl acrylates or methacrylates; polymerizable aromatic compounds such as styrene; α-olefins such as ethylene and propylene; vinyl compounds such as vinyl acetate; and diene compounds such as butadiene.

The binder resin for use in the present invention can be slected from those generally used as film-forming resins. Examples of binder resins include acrylic resins, vinyl chloride-vinyl acetate copolymerized resin, polyamide resins, epoxy resins, polyimide resins, urethane resins and polyester resins. In the case of curable resins, the preferred curable systems may be chosen from heat-curable systems such as containing epoxy, melamine or (blocked) isocyanate; oxydative polymerization systems; and photo-curable systems containing an photointiator.

Various additives, if necessary, may be further incorporated in the coating composition. Such additives include waxes such as polyethylene wax and polypropylene wax, surfactants, coupling agents, plasticizers and dispersants, for example.

The type of the solvent incorporated in the coating composition is not particularly limited, and may suitably be chosen depending upon the types of substrate material and binder resin used and the method employed to apply the coating composition. Examples of solvents include aromatic solvents such as benzene, toluene and xylene; ketone solvents such as acetone, methylethyl ketone, methylisobutyl ketone and cyclohexanone; ether solvents such as diethyl ether, isopropyl ether, tetrahydrofuran, dioxane, ethylene glycol dimethyl ether, ethylene glycol diethyl ether, diethylene glycol dimethyl ether and diethylene glycol diethyl ether; ester solvents such as ethyl acetate, n-propyl acetate, isopropyl acetate, n-butyl acetate, methyl lactate, ethyl lactate, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, propylene glycol monomethyl ether acetate, propylene glycol monoethyl ether acetate, propylene glycol diacetate and γ-butyrolactone; amide solvents such as dimethylformamide, dimethylacetamide and N-methyl-pyrrolidone. Among these solvents, ester solvents and ketone solvents, either alone or in combination with one or more other solvents, may preferably be used. Alternatively, the coating composition for use in the present invention may be water-based. In such a case, a water-based solvent may be used.

The crosslinked resin particles are incorporated in the coating composition preferably in the amount of 0.01–500 parts by weight, more preferably of 0.1–300 parts by weight, most preferably of 1–200 parts by weight, based on 100 parts by weight of solids constituent of the coating composition. In the first aspect of the present invention, the coating composition needs to contain the crosslinked resin particles in such concentrations that when formed into the resin layer, it provides microscopic projections and depressions at a surface of the resin layer. In the second aspect of the present invention, the coating composition may contain the crosslinked resin particles in such reduced concentrations that when it is formed into the light diffusion layer, the crosslinked resin particles are embedded in the light diffusion layer in a distributed manner. The coating composition may alternatively contain the crosslinked resin particles in such concentrations that when formed into the light diffusion layer, it provides microscopic projections and depressions at a surface of the light diffusion layer, as analogous to the aforementioned resin layer.

In the present invention, the selected type of crosslinked resin particles may be used alone or in combination with one or more other types of crosslinked resin particles.

In the first and second aspects of the present invention, the type and form of the material used to constitute the reflection layer are not particularly limited, and may be suitably chosen depending upon the particular reflective characteristics required and the like. A specific example is a thin metal film formed from a highly reflective metal, such as aluminum or silver, by using a known film-forming technique such as vacuum evaporation, sputtering or ion plating. The reflection layer may be formed by application of a metallic coating composition containing bright pigments such as metallic flakes.

The most preferred metallic flake is aluminum flake as it is readily availabile and has a good chemical stability. The other useful metallic flakes are those formed of gold, silver, copper, brass, titanium, chromium, nickel, nickel-chromium steel and stainless steel, for example. Metallized flake pigments, such as metallized mica flake, may also be useful.

Those metallic flakes can be prepared by finely dividing a vapor deposited metal film. The metallic flakes such prepared are very thin and, when oriented in a planar alignment, provide a near-specular, reflective surface. Methods for preparation of such metallic flakes are disclosed, for example, in Japanese Patent Laying-Open No. Hei 2-8268 and PCT International Publication No. W093/23481. Specifically, metal vapor is deposited, in the form of thin film, onto a carrier sheet of OPP (oriented polypropylene) film, CPP (crystalline propylene) film, PET (polyethylene terephthalate) film or the like. The deposited metal film is then separated from the carrier sheet and subsequently divided into metallic flakes. Such metallic flakes, when properly oriented, provide a near-specular reflective surface. Accordingly, the use of such metallic flakes leads to formation of the reflection layer having a high reflectance.

Also in the present invention, the reflection layer may be rendered half-tranmissive or half-silvered by controlling its thickness, metallic flake content and the like. The use of such a half-transmissive reflection layer results in obtaining a half-transmissive reflection type (transmission and reflection combination type) LCD devices.

In accordance with a third aspect of the present invention, a method is provided by which the reflection of the first aspect of the present invention can be fabricated. The method includes the steps of applying a coating composition containing a binder resin and crosslinked resin particles to form a resin layer having at its surface microscopic projections and depressions, and forming a reflection layer on the resin layer.

In accordance with a fourth aspect of the present invention, a method is provided by which the reflector of the second aspect of the present invention can be fabricated. The method includes the steps of forming a reflection layer and applying a coating composition containing a binder resin and crosslinked resin particles to the reflection layer to form a light diffusion layer thereon.

The coating composition used to form the resin or light diffusion layer can be applied by various techniques as appropriate depending upon the particular formulation of the coating composition used and the application-associated environments. Examples of useful application techniques include spin coating, roll coating, screen printing, spray coating and gravure coating.

In the present invention, the thickness of the resin layer is not particularly limited, as long as it permits the crosslinked resin particles to define microscopic projections and depressions at a surface of the resin layer.

The thickness of the light diffusion layer is not particularly limited, either. Although suitably chosen by taking various factors into consideration, the illustrated thickness of the light diffusion layer is 0.1 $\mu$m–50 $\mu$m.

Likewise, the thickness of the light diffusion layer is not particularly limited. Although suitably chosen by taking various factors into consideration, the illustrated thickness of the light diffusion layer is 0.01 $\mu$m–10 $\mu$m.

In the case where the resin or light diffusion layer is is formed by application of a coating composition containing a curable resin as the binder resin, a curing temperature may be set within the range of 50–300° C., preferably within the range of 140–250° C. A curing period may be varied depending upon the curing temperature set. For exemplary purposes, when the curing temperature is within the 140–250° C. range, a suitable curing period may be within the range of 10–180 minutes.

The reflective LCD devices of the present invention can be applied to various LCDs, as long as those LCDs are of the type that display images by allowing incident light that has passed through a liquid crystal layer to reflect at a reflector surface. For example, the reflective LCD devices of the present invention can be applied to conventionally known operating mode LCDs, such as a TN (twisted nematic) mode LCD, an STN (super twisted nematic) mode LCD, GH (guest-host) mode LCD, and a ferroelectric LCD. The reflective LCD devices of the present invention can also be applied to conventionally known driving mode LCDs, such as simple and active matrix mode LCDs, without limitation.

DESCRIPTION OF THE PREFERRED EMBODIMENTS

Figure 1:
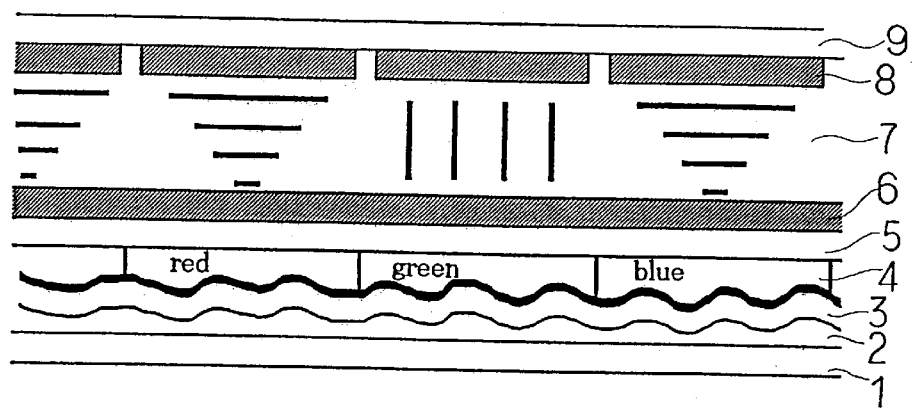
FIG. 1 is a sectional view, illustrating a reflector embodiment in accordance with the first aspect of the present invention.

FIG. 1 is a sectional view, showing one embodiment of a reflective LCD device in accordance with the first aspect of the present invention. Disposed on a lower substrate 1 is a resin layer 2 having at its surface microscopic projections and depressions. The substrate 1 can be formed from materials generally known as suitable for use in the manufacture of LCD devices, such as glass and plastic. The plastic substrate may be used in the form of film, such as a polyester, polycarbonate, polyallylate, polyether sulfone, or cyclic non-crystalline polyolefin film. The resin layer 2 is formed by the application of a coating composition containing a binder resin and crosslinked resin particles, so that the resin layer has at its surface microscopic roughness, i.e., microscopic projections and depressions, which is attributed to the presence of the crosslinked resin particles.

A reflection layer 3 is provided to overlie the resin layer 2 so as to follow the microscopic surface roughness of the resin layer 2. Accordingly, the reflection layer 3 also has at its surface microscopic projections and depressions corresponding in shape to those defined on the surface of the resin layer 2.

Disposed on the reflection layer 3 is a color filter layer 4 on which a planarizing layer 5 is provided. The planarizing layer 5 can be defined by a transparent coating film and may be made from acrylic resins, for example.

A lower transparent active electrode 6 formed of ITO (indium tin oxide) or the like is provided to overlie the planarizing layer 5. Further provided is an upper substrate 9 formed of material, either similar or dissimilar in type to the material used for the lower substrate 1. Disposed inwardly of the upper substrate 9 is an upper transparent active electrode 8 formed of ITO (indium tin oxide) or the like. A liquid crystal layer 7 is held in a position between the lower and upper transparent active electrodes 6 and 8.

The light entering the LCD device is reflected at a surface of the reflection layer 3. Since the reflection layer 3 has a surface profile following the shapes of the microscopic projections and depression of the underlying resin layer 2, as stated above, the light incident on the reflection layer surface from various directions is reflectively scattered in a direction perpendicular to a display screen. This results in displaying bright images with a wide angle of view.

Figure 2:
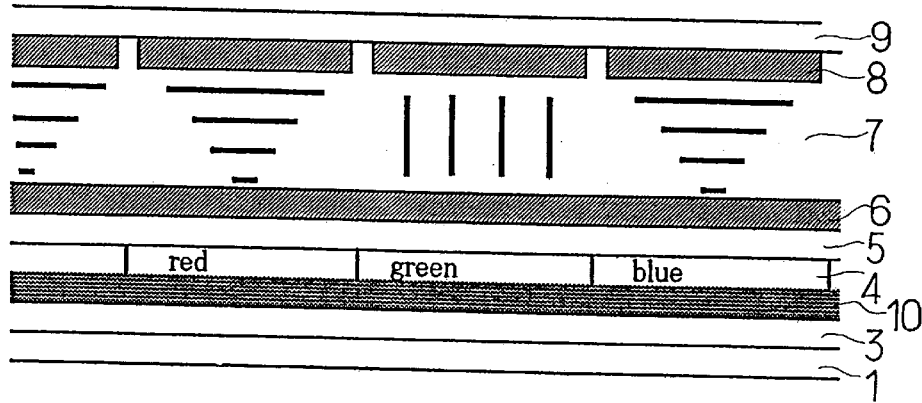
FIG. 2 is a sectional view, illustrating a reflector embodiment in accordance with the second aspect of the present invention.

FIG. 2 is a sectional view, showing one embodiment of a reflective LCD device in accordance with the second aspect of the present invention. The reflection layer 3 is provided to overlie the lower substrate 1. A light diffusion layer 10 is formed on the reflection layer 3 by application of a coating composition containing a binder resin and crosslinked resin particles. As analogous to the LCD device embodiment shown in FIG. 1, a sequence of color filter layer 4, planarizing layer 5, lower transparent active electrode 6, liquid crystal layer 7, upper transparent active electrode 8 and upper substrate 9 is provided to overlie the light diffusion layer 10.

The light entering the LCD device is reflected at a surface of the reflection layer 3. Due to the presence of the crosslinked resin particles incorporated in the light diffusion layer 10, the reflected light is scattered when it passes through the light diffusion layer 10. Accordingly, the light entering the device from various directions can be reflectively scattered also in a direction perpendicular to a display screen. This results in displaying bright images with a wide angle of view.

The reflective LCD devices shown in FIGS. 1 and 2 can be converted to half-transmissive reflection type LCD devices by rendering the reflection layer 3 half-silvered or half-transmissive. In such a case, a light source such as a backlight will be provided under the lower substrate 1.

Those skilled in the art will recognize that the LCD device of the present invention is not limited to those constructions and configurations shown in FIGS. 1 and 2.

EXAMPLES

The present invention will be now described in detail with reference to non-limiting examples. All parts and percentages used in the following examples are by weight unless otherwise specified.

Preparation of Crosslinked Resin Particles

A reactor equipped with a stirring and heating unit, thermostat, nitrogen inlet tube, condenser and decanter was charged with 213 parts of bis(hydroxyethyl)taurine, 208 parts of neopentyl glycol, 296 parts of phthalic anhydride, 376 parts of azelaic acid and 30 parts of xylene. The mixture was then heated to initiate a reaction. Water produced during the reaction was removed in the form of azeotropic mixture with xylene. A temperature of the reaction mixture was controlled to reach 210° C. in about 3 hours from the start of reflux. Stirring and dewatering were continued until an acid value indicating the amount of carboxylic acid reached 135 mgKOH/g. After the reaction mixture was cooled to 140° C., 500 parts of glycidyl ester of verstic acid, "CARDURA E10" (name used in trade and manufactured by Shell Chemical), was added dropwise thereto over 30 minutes. After the subsequent 2-hour stirring, the reaction was terminated. As a result, a zwitter ion group-containing polyester resin was obtained having an acid value of 55 mgKOH/g, a hydroxyl value of 91 mgKOH/g and a number-average molecular weight of 1,250.

A mixture containing 10 parts of the polyester resin having a zwitter ion group, 140 parts of deionized water, 1 part of dimethylethanol amine, 50 parts of styrene and 50 parts of ethylene glycol dimethacrylate was vigorously stirred in a stainless steel beaker to prepare a monomer dispersion. Also, an aqueous initiator was prepared by mixing 0.5 parts of azobiscyanovaleic acid, 40 parts of deionized water and 0.32 parts of dimethylethanol amine.

A reactor equipped with a stirring and heating unit, thermostat, nitrogen inlet tube and condenser was charged with 5 parts of the aforementioned polyester resin having a zwitter ion group, 280 parts of deionized water and 0.5 parts of dimethylethanol amine. The reaction mixture was then elevated in temperature to 80° C. 251 parts of the monomer dispersion and 40.82 parts of the aqueous initiator were concurrently added dropwise to the reaction mixture over 60 minutes. The reaction was continued for another 60 minutes and then terminated to obtain an emulsion containing crosslinked resin particles.

Xylene was added to the above-obtained emulsion, and dewatering was accomplished by azeotropic distillation under a reduced pressure to substitute xylene for the medium, so that a xylene solution was obtained containing the crosslinked resin particles on the order of 30% solids content.

A particle size distribution of the obtained crosslinked resin particles was determined using a laser diffraction type particle size distribution measuring apparatus. The results showed that 97% of the particles was in the 10–1,000 nm particle size range. An average particle size was 125 nm.

EXAMPLE 1

A coating composition containing the above-obtained crosslinked resin particles was prepared from the following formulation.

| Ingredients | Parts by weight |
| --- | --- |
| thermosetting acrylic resin A[1] | 25.0 |
| trimellitic anhydride | 2.5 |
| crosslinked resin particles[2] | 50.0 |
| KBM-403[3] | 1.0 |
| propylene glycol monomethyl-ether acetate | 21.5 |
| Total | 100.0 |

[1] GMA/ST/MMA copolymer having a number-average molecular weight of 7,500 and a solids content of 40%, manufactured by Nippon Paint Co., Ltd.
[2] In the form of the xylene solution prepared in the above-described preparation example which contained the crosslinked resin particles on the order of 30% solids content.
[3] γ-glycidoxypropyltrimethoxysilane, manufacture by Shinetsu Silicone Co., Ltd.

The coating composition obtained was spin coated on a 0.7 mm thick glass substrate and then heat cured in a clean oven at 240° C. for 120 minutes to form a resin layer having at its surface microscopic projections and depressions. A thickness of the resin layer was 2.0 μm with Rmax=0.5 μm.

An aluminum thin film, as a reflection layer, was sputter formed on the resin layer so as to follow the shapes of microscopic projections and depressions of the resin layer. A thickness of the aluminum thin film was 0.1 μm.

A spectral reflectance of a reflector constructed from the resin and reflection layers was 80%, when measured by a spectrophotometric calorimeter CM-1000 (product of Minolta Co., Ltd.).

EXAMPLE 2

A coating composition containing the above-obtained crosslinked resin particles was prepared from the following formulation.

| Ingredients | Parts by weight |
| --- | --- |
| thermosetting acrylic resin B[4] | 12.5 |
| UBAN 20N-60[5] | 4.2 |
| crosslinked resin particles[2] | 30.0 |
| propylene glycol monomethyl-ether acetate | 53.3 |
| Total | 100.0 |

[4] Manufactured by Nippon Paint Co., Ltd. and having a hydroxyl value = 45, an acid value = 15, a number-average molecular weight of 18,000 and a solids content of 60%.
[5] Butylated melamine resin (solids content = 60%) manufactured by Mitsui Toatsu Co., Ltd.

The coating composition obtained was spin coated on a 0.7 mm thick glass substrate and then heat cured in a clean oven at 200° C. for 120 minutes to form a resin layer having at its surface microscopic projections and depressions. A thickness of the resin layer was 1.5 μm with Rmax=0.3 μm.

An aluminum thin film, as a reflection layer, was sputter formed on the resin layer so as to follow the shapes of microscopic projections and depressions of the resin layer. A thickness of the aluminum thin film was 0.02 μm.

A spectral reflectance of a reflector thus constructed from the resin and reflection layers was 50%, when measured by a spectrophotometric calorimeter CM-1000 (product of Minolta Co., Ltd.).

A transmittance of the reflector was also determined as being 10% when measured by a spectrophotometer OSP-SP200 (product of Olympus Co., Ltd.). These results demonstrate that the reflector of this Example can be used for half-transmissive reflection type LCD device.

Comparative Example

A coating composition containing inorganic silica particles (AEROGIL), instead of the crosslinked resin particles, was prepared from the following formulation. The silica particles used were measured for particle size distribution. The results indicated that 80% of the silica particles was in the 10 nm–1,000 nm size range, with an average particle size being 750 nm.

| Ingredients | Parts by weight |
| --- | --- |
| thermosetting acrylic resin A[1] | 25.0 |
| trimellitic anhydride | 2.5 |
| AEROGIL R812S[6] | 15.0 |
| KBM-403[3] | 1.0 |
| propylene glycol monomethyl-ether acetate | 56.5 |
| Total | 100.0 |

[6] Silica particles manufactured by Nippon Aerogil Co., Ltd.

The comparative coating composition such obtained was coated onto a 0.7 mm thick glass substrate in the same manner as in Example 1. Abnormal agglomeration of particles was observed in the coated film, which resulted in the failure to form a uniform distribution of microscopic projections and depression at a film surface. An aluminum thin film, as a reflection layer, was vapor deposited on the coated film to form a comparative reflector. A refelctance of the comparative reflector was determined to be 32%.

The LCD devices incorporating the reflector of the present invention are capable of displaying bright images with a wide angle of view. Also, the present method enables the simplified and efficient fabrication of the reflector.

What is claimed Is:

1. A reflector for use in reflective liquid crystal display devices which display images by reflecting at a reflector surface the incident light that has passed through a liquid crystal layer, said reflector comprising:

a reflection layer; and a light diffusion layer formed on said reflection layer by application of a coating composition containing a binder resin and crosslinked resin particles to said reflection layer, wherein said crosslinked resin particles are an emulsion polymerization product of an emulsifiable and zwitter ion group containing polyester resin and an ethylenically unsaturated monomer.

2. The reflector of claim 1, wherein at least 90% of the crosslinked resin particles is distributed within the 10 nm–1,000 nm size range.

3. The reflector of claim 1, wherein said reflection layer is in the form of a thin metal film.

4. A reflective liquid crystal display device incorporating the reflector of claim 1.

* * * * *

UNITED STATES PATENT AND TRADEMARK OFFICE
CERTIFICATE OF CORRECTION

PATENT NO. : 6,623,812 B1
APPLICATION NO. : 09/510950
DATED : September 23, 2003
INVENTOR(S) : Hideto Tanaka It is certified that error appears in the above-identified patent and that said Letters Patent is hereby corrected as shown below:

Title Page,
In the ABSTRACT, line 6, after "particles" delete the period "." and insert
-- , and a reflection layer formed on the resin layer so as to follow the shapes of microscopic projections and depressions of the resin layer. --.

Column 3,
Lines 29-30, "$-N^+-R-COO\_$ or $-N_+-R-SO_{3\_}$" should be -- $-N^+-R-COO^-$ or $-N^+-R-SO_3^-$ --.

Signed and Sealed this

Thirty-first Day of July, 2007

JON W. DUDAS
*Director of the United States Patent and Trademark Office*